United States Patent [19]

Rizzo et al.

[11] Patent Number: 5,841,808
[45] Date of Patent: Nov. 24, 1998

[54] SPREAD SPECTRUM CHIP RATE TRACKING SYSTEM

[75] Inventors: Michael A. Rizzo, Garden Grove; Robert E. Gorney, Riverside, both of Calif.

[73] Assignee: McDonnell Douglas Corporation, Long Beach, Calif.

[21] Appl. No.: 409,763

[22] Filed: Mar. 23, 1995

[51] Int. Cl.$^6$ .................................................. H04B 1/69
[52] U.S. Cl. .......................... 375/208; 375/206; 375/367; 370/515
[58] Field of Search ................................... 375/200, 206, 375/208–210, 367; 370/18, 107, 515

[56] References Cited

U.S. PATENT DOCUMENTS

| | | | |
|---|---|---|---|
| 4,285,060 | 8/1981 | Cobb et al. | 375/376 |
| 4,291,409 | 9/1981 | Weinberg et al. | 375/347 |
| 4,301,537 | 11/1981 | Roos | 375/367 |
| 4,475,186 | 10/1984 | Gutleber | 370/18 |
| 4,575,861 | 3/1986 | Levreault | 375/200 |
| 4,653,069 | 3/1987 | Roeder | 380/31 |
| 4,665,404 | 5/1987 | Christy et al. | 375/210 |
| 4,758,839 | 7/1988 | Goebel et al. | 342/132 |
| 4,791,377 | 12/1988 | Grandfiled et al. | 327/105 |
| 4,951,237 | 8/1990 | Essenwanger | 364/721 |
| 5,081,645 | 1/1992 | Resnikoff et al. | 375/210 |
| 5,090,024 | 2/1992 | Vander Mey et al. | 375/204 |
| 5,210,770 | 5/1993 | Rice | 375/200 |
| 5,210,771 | 5/1993 | Schaeffer et al. | 375/202 |
| 5,235,613 | 8/1993 | Brown et al. | 375/202 |
| 5,329,549 | 7/1994 | Kawasaki | 375/200 |

OTHER PUBLICATIONS

Spread Spectrum Communications, vol. III, 1985 pp. 154–159 Computer Science Press, By Simon, Omura, Scholtz, Levitt Magnavox ADP publications, Spread Spectrum Applications and Stateofthe–Art Equipment Nov. 22, 1972 by CAHN MX–TM–3134–72 p. 5(72–80).

Primary Examiner—Young T. Tse
Attorney, Agent, or Firm—The Bell Seltzer Intellectual Property Law Group of Alston & Bird LLP

[57] ABSTRACT

In a new receiver design, the specific transmitter unit is unchanged from a prior patent application but may also be substantially as described in the prior art. The transmitter is initially activated by the input of the pseudo-random generator code. This code may be any alpha-numeric series, but must be identical to that input to the receiver. When the code is input through the keypad, the transmitter uses internal algorithms to generate a unique shift-register feedback combination. This creates a pseudo-random (PN) code which repeats after a programmable number of bits, depending upon desired maximal signal correlation time. That is the longer the code the longer the correlation time. This PN code sequence is clocked at the desired clock (CHIP) rate inside the transmitter unit. The PN code sequence which is thus generated is then added in phase to the data which is a substantially lower rate than the CHIP rate. After mixing with the PN code and data, the RF frequency CW signal power is spread across a frequency band equivalent to twice the PN code clock rate. The signal power density per hertz is now well below an identical non-spread signal at the communications data rate and ideally below the systems noise level. At the receiver the same pseudo-random code which was used to transmit the information is entered into the receiver unit for activation. This is then used to configure three programmable PN sequence generators which output three identical PN code sequences which vary only in a one-half phase shift of the CHIP rate from each other. The signals received by the antenna are converted to an intermediate frequency and mixed with the locally generated PN code sequences. When code alignment occurs, threshold detector circuitry senses the presence of the correlated data signals. The relative level of the signals are then sensed by the microprocessor which varies the PN clock oscillator to maintain lock with the incoming signal. The data is now available as useable information at the data port.

14 Claims, 4 Drawing Sheets

SPREAD SPECTRUM CHIP RATE TRACKING SYSTEM

FIELD OF THE INVENTION

The field of this invention relates to spread spectrum techniques which have been used for many years to enhance communication effectiveness in signal jamming environments or to hide communications from detection by hostile intercept receivers. More particularly, this invention relates to spread spectrum receivers in a direct and nondirect communication system such as in repeater or satellite communications environments.

BACKGROUND OF THE INVENTION

As intercept receiver technology advances, the pseudo random characteristics of the modulating signal used to "spread" the communication signal must increase in complexity to counter the detection threat. The capability to greatly increase the code complexity without affecting the correlation of time was the subject of a patent application still pending entitled, "Spread Spectrum Communications System," filed as U.S. patent application Ser. No. 07/795,165 on Nov. 18, 1991, now U.S. Pat. No. 5,677,928, which has been classified. The correlation approach used in that invention created a programmable digital matched filter and associated circuitry to retard the phase of a locally-generated, direct-sequence spread spectrum signal in relation to an incoming communication signal. This and other design approaches rely on transmitting and receiving systems being in direct contact, with complete control of the frequency of both communicating nodes. This technique does not allow communications where frequency transponder or repeating node techniques are required since the frequency aging drift or other uncertainties of that node are not directly controlled by one of the communicating devices. Accordingly, a degradation of the incoming signal results because the incoming detection is based on a synchronized frequency system. The instant invention provides a communications technique that allows communication in direct and nondirect cases without degrading the correlation time or complexity of the spreading signal. In this spread spectrum system, the transmitted communication signal is created using a direct sequence spread spectrum technique that spreads the power transmitted over a large frequency range and therefore the identifying signal is at or below the RF noise floor. The resulting signal is undetectable to any receiver, other than one employing the specific spreading code sequence of the transmitter used to spread the signal. Active digital matched filter designs allow communication using random-length, Pseudo-Random Number (PN) Codes that can be changed anytime required and may be selected from thousands of candidate codes. The added complexity of electronically varying not only the bit content but the length of the spreading pseudo random code greatly increases the required complexity and therefore the ability of an intercept receiver to detect the presence of the communicating signal. The design disclosed in the U.S. Pat. No. 5,677,928 for example uses a reference oscillator frequency to derive the pseudo-random code rate, which then must be used by the RF oscillator as a phase-lock reference to communicate this frequency to the receiver for pseudo-random code clock lock and signal correlation. The addition of another oscillator in the communication path, such as would occur if the communication is through a terrestrial repeater or satellite transponder, injects an unknown frequency into the path. The prior design correlation would then attempt to compensate for this additional drift and quickly lose PN sequence clock lock to the intended transmitter by attempting to lock onto a frequency which differs from that transmitted. The use of the design of the receiver disclosed herein permits recovery of such spread signals when communicating between nodes which are not within radio line-of-sight by adding circuitry for the receiver to track the code clock (CHIP) rate itself without regard to variations in the RF frequency received.

BRIEF DESCRIPTION OF THE INVENTION

The communication equipment proposed herein consists of a new receiver design. The specific transmitter unit is unchanged from the prior patent application but may also be substantially as described in the prior art. The transmitter is initially activated by the input of the pseudo-random generator code. This code may be any alpha-numeric series, but must be identical to that input to the receiver. When the code is input through the keypad, the transmitter uses internal algorithms to generate a unique shift-register feedback combination. This creates a pseudo-random (PN) code which repeats after a programmable number of bits, depending upon desired maximal signal correlation time. That is the longer the code the longer the correlation time. This PN code sequence is clocked at the desired clock (CHIP) rate inside the transmitter unit. The PN code sequence which is thus generated is then added in phase to the data which is a substantially lower rate than the CHIP rate. After mixing with the PN code and data, the RF frequency CW signal power is spread across a frequency band equivalent to twice the PN code clock rate. The signal power density per hertz is now well below an identical non-spread signal at the communications data rate and ideally below the systems noise level. At the receiver, the same pseudo-random code which was used to transmit the information is entered into the receiver unit for activation. This is then used to configure three programmable PN sequence generators which output three identical PN code sequences which vary only in a one-half phase shift of the CHIP rate from each other. The signals received by the antenna are converted to an intermediate frequency and mixed with the locally generated PN code sequences. When code alignment occurs, threshold detector circuitry senses the presence of the correlated data signals. The relative level of the signals are then sensed by the microprocessor which varies the PN clock oscillator to maintain lock with the incoming signal. The data is now available as useable information at the data port. The system is designed so that the transmitter and receiver signals meet specific correlation requirements and operational performance over transponder or repeated links, as well as direct communications. The receiver incorporates several approaches to meet this correlation time design goal and non-direct communications capability as described hereafter.

DETAILED DESCRIPTION OF THE INVENTION

Figure 1:
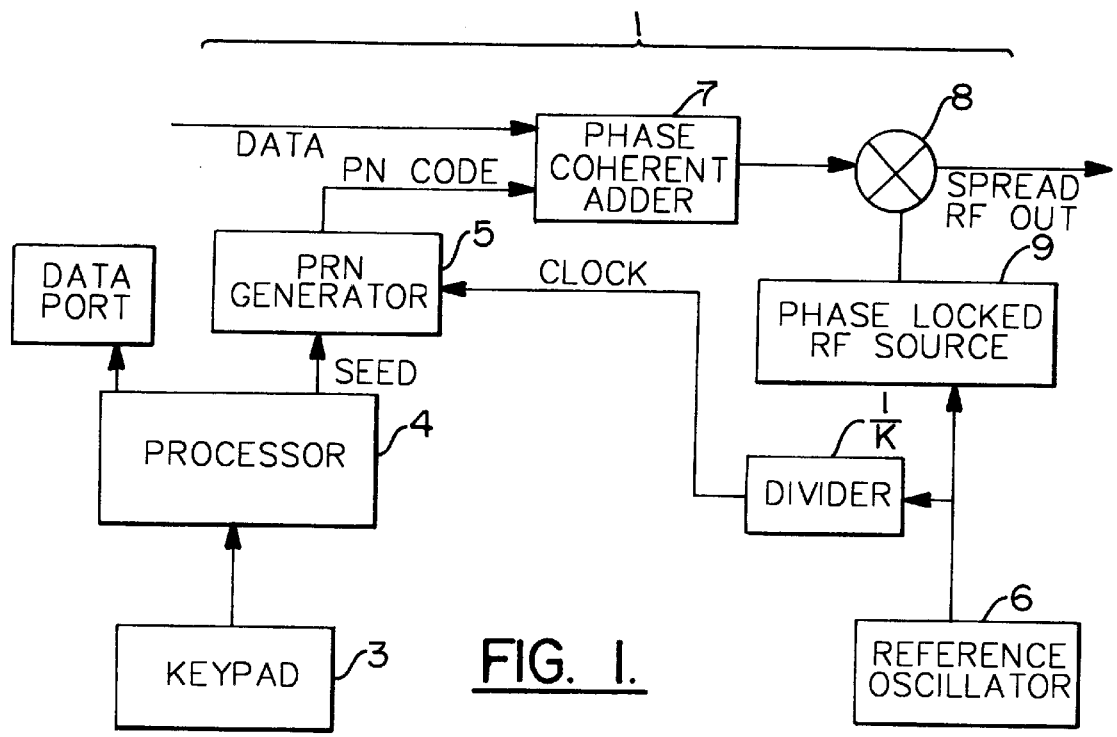
FIG. 1 is a block diagram of the transmitter.

The communication equipment proposed herein consists of a multiple correlation path receiver design. The particular transmitter unit used herein is unchanged from the prior patent application and may be substantially as described in the prior art provided the same PN code sequence length and content is used. With reference to FIG. 1, a transmitter 1 is initially activated by the input of the pseudo-random generator code (Operator code). This code may be any alpha-numeric series, but must be identical to the code used by the receiver 2, shown in FIG. 3, so as to generate the identical PN code. When the Operator code is input through the keypad 3, (the keypad may alternatively be a set of thumb wheel switches) the processor 4 of transmitter 1, applies the code to the PN code generator 5 of transmitter 1 which uses internal algorithms to create a unique random like numeric shift-register feedback combination and initial register seed. The resulting pseudo-random (PN) code sequence repeats after a programmable number of bits, depending upon desired maximal signal correlation time. The PN sequence in the receiver is clocked at the desired clock (CHIP) rate in the transmitter 1 by dividing the reference oscillator 6 by a specified, pre-selected amount K. The PN sequence which is thus generated is then added by a Phase Coherent Adder 7, in phase with the data to be communicated, which is at a relatively low rate compared to the PN sequence as is well known in the art. The composite PN code/data bits are then mixed in a mixer 8, with the desired RF frequency CW signal 9 for transmission. The system described can operate at any RF carrier frequency and at PN code rates up to approximately 100 megahertz as implemented although higher rates are theoretically possible.

Design enhancements of this invention as indicated herein allow this operational performance over transponder or repeater links, as well as direct communications due to the fact that the receiver and the transmitter need not be locked together. The invention incorporates several approaches to meet fast correlation time design goals and non-direct communications capability. In operation, the transmitter 1 outputs a base-band modulated RF signal at the desired operating frequency. This signal will vary from the nominal frequency because of internal oscillator age, temperature and frequency drift. Additional frequency variances are caused by external oscillator drift and the transponder or repeater, as well as Doppler effects.

Figure 2:
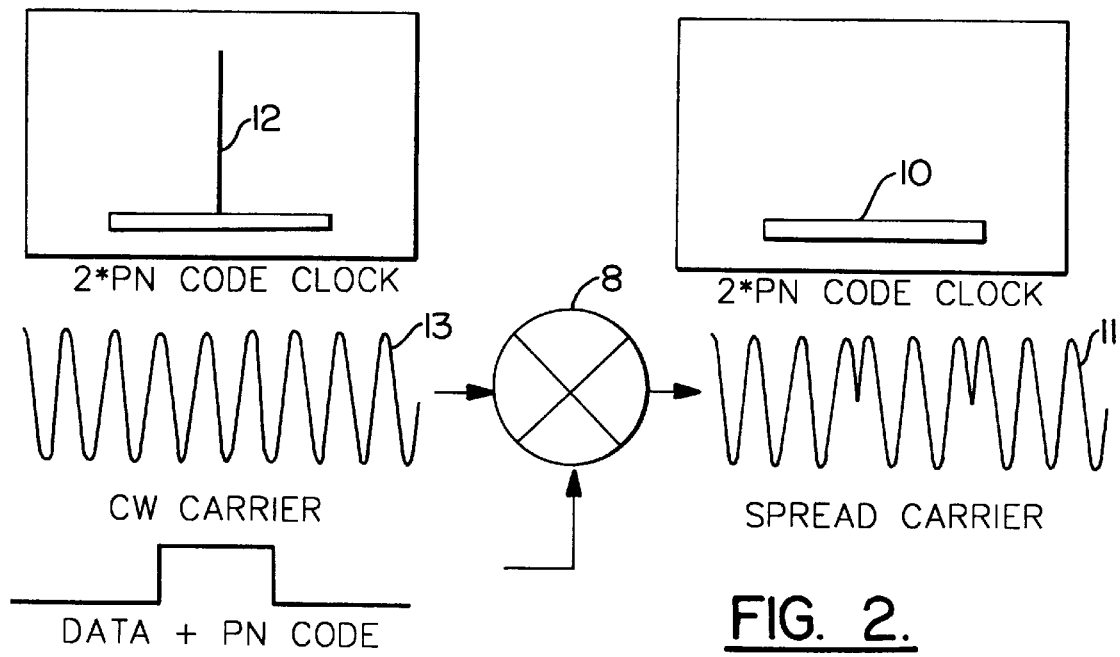
FIG. 2 is a pictorial diagram of the Signal transmission characteristics.

With reference to FIG. 2, after mixing the PN code and data, the RF frequency CW signal power 12 is spread across a frequency band equivalent to twice the PN code clock rate. The signal power density 10 per hertz of the spread spectrum signal 1, is now well below the signal power density 12 per hertz of an identical non-spread signal 13 and ideally below the system noise level.

Figure 3:
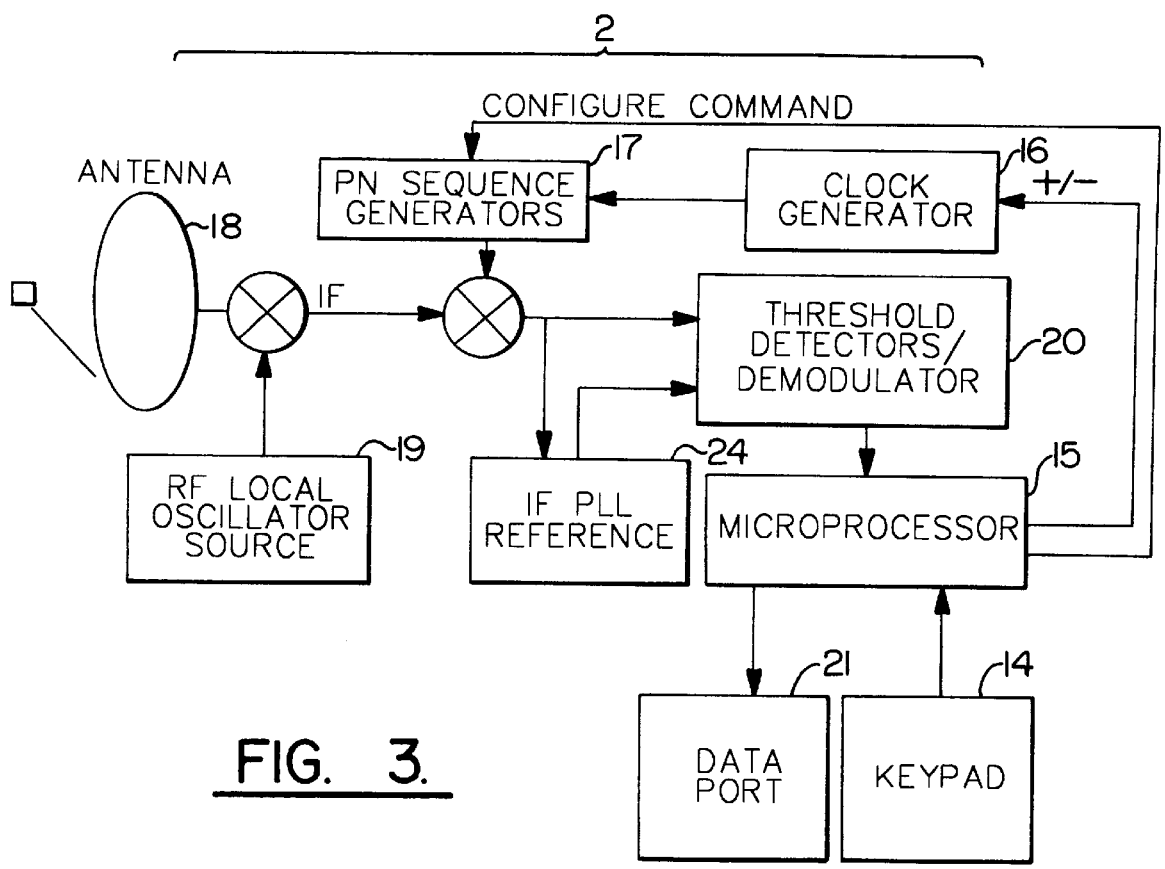
FIG. 3 is a block diagram of the receiver.

With reference to FIG. 3 the same pseudo-random code (Operator) which was used to generate the transmitter PN code is entered through the keypad 14 of the receiver 2 to generate the receiver 2 PN codes. The receiver 2 microprocessor 15 then generates a clock code which is applied to a clock generator 16 and, in parallel, sends the Operator code to configure the PN sequence generators 17. Clock pulses are then applied to the PN sequence generators 17 by the clock generator 16 and identical internal algorithms generate the same PN code sequence as used by the transmitter 1. However, in the instant receiver design, there are three PN sequence generators 17 which output three identical PN sequences which vary only in phase by one-half cycle from each other.

Figure 4:
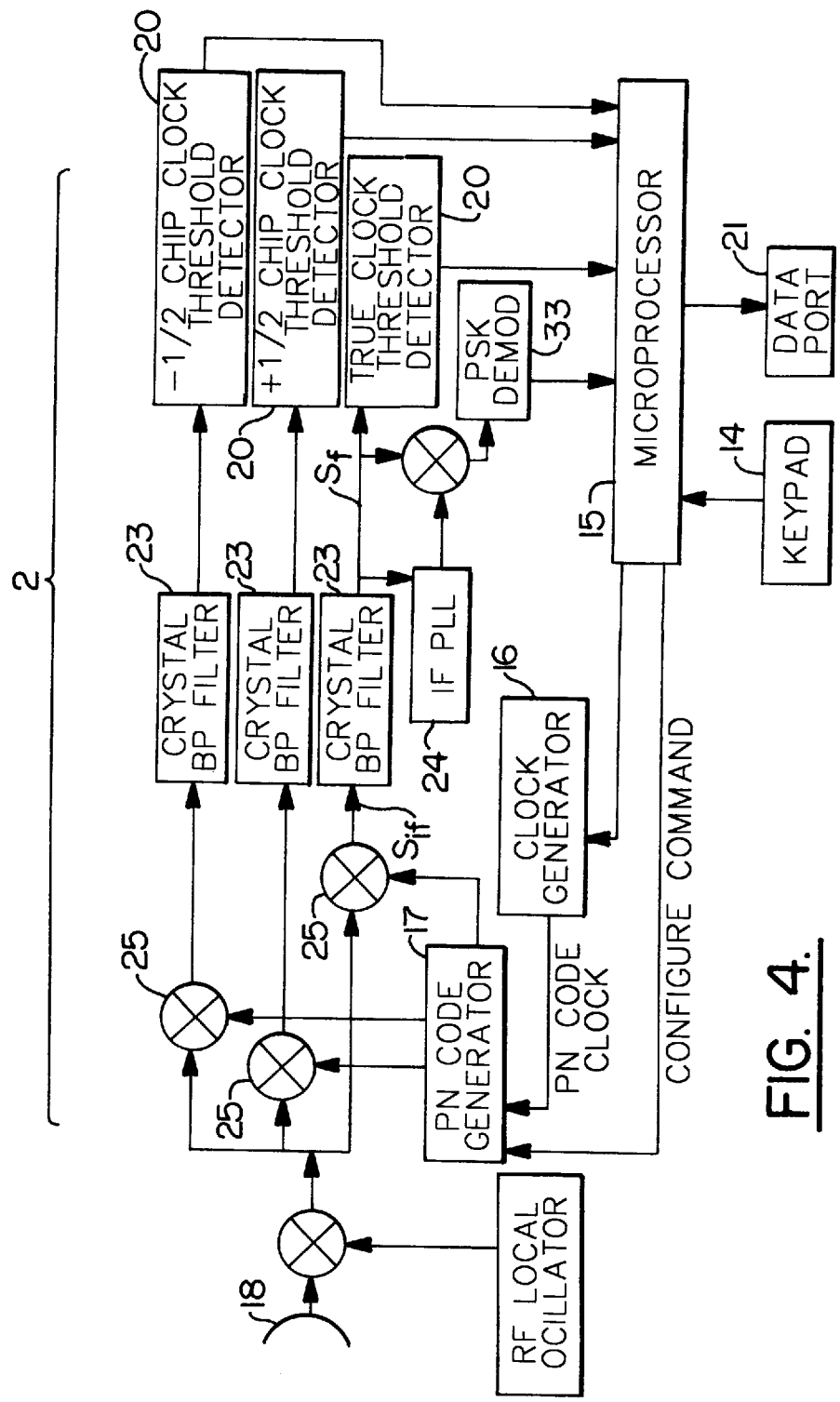
FIG. 4 is a more detailed block diagram of the receiver.

The signals received by the antenna 18 are down converted by the receiver 2 mixes the incoming spread spectrum RF signal against the locally generated local oscillator 19 signal tuned below the RF carrier by convenient frequency difference to yield an intermediate frequency (IF) as is well known in the art. All under the control of the processor 15, this mixing yields a spread spectrum signal well below the noise floor as centered at the IF with a frequency uncertainty equivalent to the sum of the above-mentioned frequency variances. The system is designed so that the transmitter 1 and receiver 2 signals meet specific correlation requirements. These are correct RF frequency, CHIP rate, PN code and PN code phase match. To be useful in a communications environment, these criteria must be evaluated very quickly. The current system is designed to achieve complete correlation of data output in less than one second, with PN Codes which repeat every 10,000 bits, adding to the signal covertness by allowing "burst" half-duplex communication. With reference to FIG. 4, the signal is then mixed with three locally generated PN code sequences from the three PN code generators 17. The three identical PN sequences are separated in phase by plus or minus one-half CHIP. When correlation has occurred another IF signal will appear at the input of each of the three threshold detector circuitry as a spike of correlated signal energy. The frequency of this signal will be within the sum of the frequency variations from the center IF. This signal first passes through crystal band pass filters 23, with the band centered around the IF and a bandwidth equivalent to the sum of the frequency variations. Then the filtered signal is passed to the threshold detectors 20. A Phase Locked Loop 24, (PLL) senses the filtered correlation signal and changes frequency to phase lock to it. The IF Phase Locked Loop 24 (PLL) signal is used to demodulate the data from the correlator received signal based on the true clock signal. The relative power level of the three IF correlator signals are monitored by the microprocessor 15 which controls the speed of the clock generator 16 which drives the PN sequence generators 17. The microprocessor 15 increases or decreases the speed of the code clock generator 16 under digital control to achieve the maximal correlation signal power in the main PN correlation mixer 25 by maintaining equal signal power in the leading one-half phase path+ and lagging one-half phase correlator path-. That is when the signal power level of the leading one-half phase and lagging one-half phase correlator paths are equal then the base signal power of the true clock PN correlator is at its maximum. The true clock signal is in turn demodulated by a demodulator 33 as shown in FIG. 4 through straight forward PSK techniques and the low rate data is made available as useable information at the data port 21.

Figure 5:
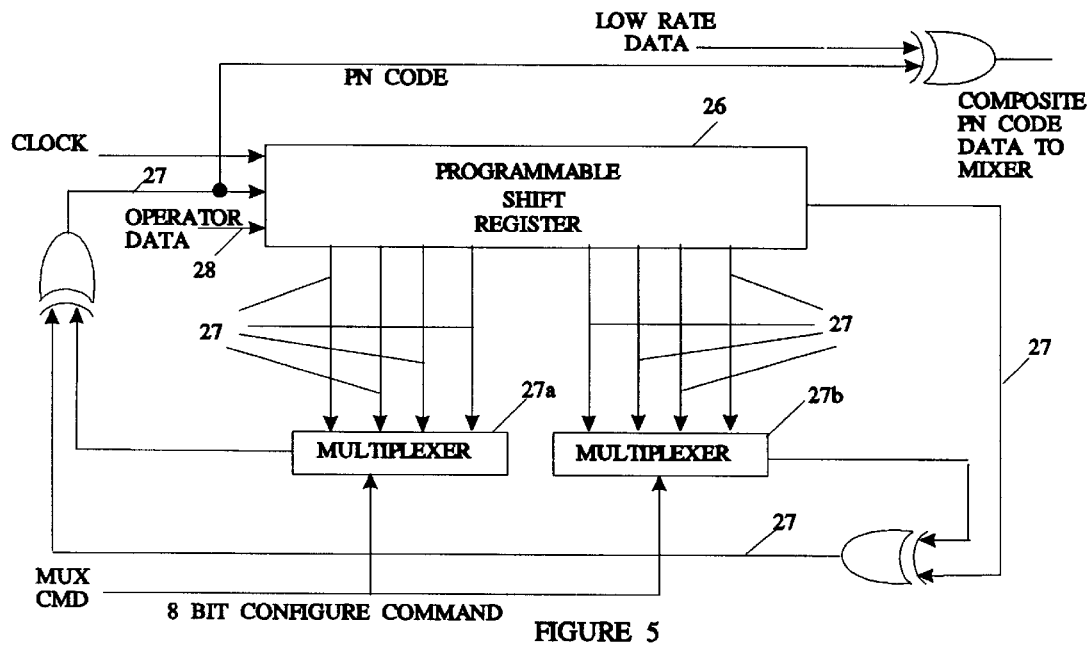
FIG. 5 is a block diagram of the PN sequence generator.
Figure 6:
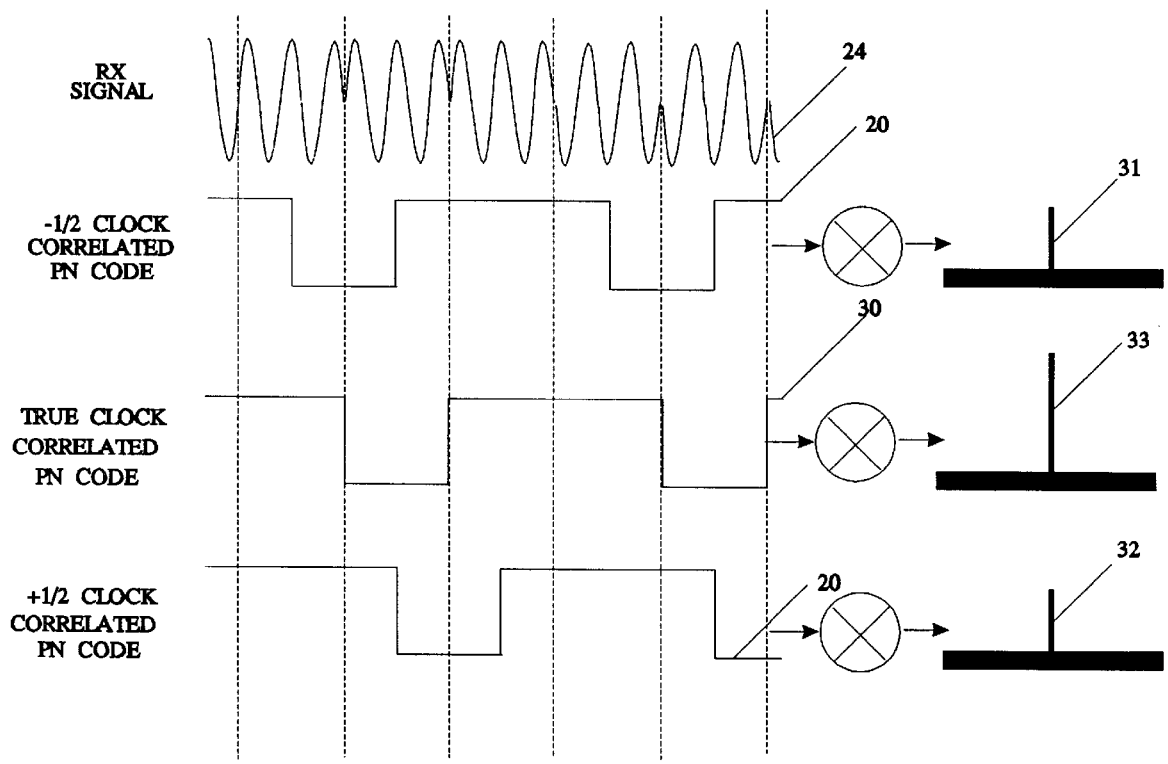
FIG. 6 is a pictorial diagram of the spread spectrum signal reception/correlation system.

In this invention the transmitter and receiver units have equivalent circuitry, creating the identical PN code sequences driving the spreading and correlating mixers. A transmitting unit requires one PN sequence generator circuit and the receiver requires three PN sequence generating circuits in order to lock onto the true data signal as described herein. As shown in FIG. 5, the PN sequence generator is a programmable length shift register 26 with programmable feedback taps 27 including multiplexors 27a and 27b and a variable Operator data tap 28 which permits the creation of create thousands of multiple length PN codes used to spread the low rate data. The receiver contains logic circuitry (not shown) which divides the code clock between the various sequence generators so only one oscillator is required. In order to achieve maximal signal correlation and "de-spread" the incoming signal, the phase transitions in the incoming signal must occur at precisely the same time as the PN code mixing sequence 20 in the receiver unit correlator mixer as is shown in FIG. 6. In a properly constructed PN code, this occurs only when the received code and the internally generated codes are phase aligned The correlation circuitry includes a CHIP retard/delay circuit, well known in the art, which allows very fast PN code alignment, of the three threshold detectors, using analog to digital converters. It is important for the establishment of initial lock for the threshold of the true clock to be evaluated by the microprocessor 15. The microprocessor 15 monitors the relative IF power signal levels 31, 32 and 33 respectively. In certain circumstances the threshold detected for the phase shifted signals may indeed be equal while the true clock threshold is actually below these thresholds. This is an indication that proper PN sequence phase lock has not been achieved. The microprocessor computes an average noise level of the environment from the threshold detector and determines if the incoming signal is properly phased by computing the difference in the level of the true clock signal energy and the average of the environment. In the preferred environment this difference is set to a value of at least 4 dB. If the power level difference is less than the threshold, the microprocessor 15 then causes a delay in the clock by retarding it one CHIP and then again computing the difference between the noise environment and the true clock signal energy. Once the true clock threshold reaches the predetermined level above the environment (e.g. 4 dB) which is deemed acceptable, the microprocessor varies the rate of the receiver PN sequence clock as required to keep the base or true clock threshold signal level at a maximum and the leading 31 and lagging 32 one-half phase CHIP rate threshold power levels equal. The CHIP rate and PN sequence for the receiver and the received true signal are then exactly matched and maximal processing gain is achieved. The assembly language program used to drive the microprocessor 15 which implements the digital control elements in the receiver is set forth in table I below along with initial variables and a memory map for the CHIP rate configuration information and PN code generator configuration selections.

TABLE I
DEMO PRNGEN CONFIGURATION TABLE

CHIP RATE CONFIGURATION ( LEFT THUMBWHEEL SWITCH )

0. 4.91 MHZ
1. 2.457 MHZ
2. 1.228 MHZ
3. 1.000 MHZ
4. 614 KHZ
5. 312 KHZ
6. 156 KHZ
7. 128 KHZ
8. 100 KHZ
9. 78.8 KHZ

PRNGEN CONFIGURATION SELECTION ( RIGHT THUMBWHEEL SWITCH )

0. L=28     Y1=08H   Y2=12H   SEED=00
1. L=60     Y1=06H   Y2=10H   SEED=01
2. L=110    Y1=05H   Y2=11H   SEED=01
3. L=1785   Y1=08H   Y2=13H   SEED=01
4. L=7905   Y1=04H   Y2=09H   SEED=01
5. L=4681   Y1=08H   Y2=15H   SEED=01
6. L=254    Y1=08H   Y2=10H   SEED=01
7. L=8001   Y1=06H   Y2=13H   SEED=01
8. L=1736   Y1=05H   Y2=13H   SEED=01
9. L=4681   Y1=08H   Y2=13H   SEED=01

DEMOCONFG

-9-

RSUCESS MEMORY MAP

| ADDR | CONTENT | ADDR | CONTENT |
|------|---------|------|---------|
| 00 |  | 10 |  |
| 01 |  | 11 |  |
| 02 |  | 12 |  |
| 03 |  | 13 |  |
| 04 |  | 14 |  |
| 05 |  | 15 |  |
| 06 |  | 16 |  |
| 07 |  | 17 |  |
| 08 |  | 18 |  |
| 09 |  | 19 |  |
| 0A |  | 1A |  |
| 0B |  | 1B |  |
| 0C |  | 1C |  |
| 0D |  | 1D |  |
| 0E |  | 1E |  |
| 0F |  | 1F |  |

| ADDR | CONTENT | ADDR | CONTENT |
|------|---------|------|---------|
| 20 | SEED VARIABLE (MSB) | 30 |  |
| 21 | SEED VARIABLE (LSB) | 31 |  |
| 22 | RCVR PRNGEN CONFIG | 32 |  |
| 23 | XMITR PRNGEN CONFIG | 33 |  |
| 24 | BAUD RATE (MSB) | 34 |  |
| 25 | BAUD RATE (LSB) | 35 |  |
| 26 | RCVR PRN CYCLE LENGTH (MSB) | 36 |  |
| 27 | RCVR PRN CYCLE LENGTH (LSB) | 37 |  |
| 28 | VCO VOLTAGE VARIABLE | 38 |  |
| 29 | INTO STATUS 0=NO;1=INTO | 39 |  |
| 2A |  | 3A |  |
| 2B | 0 PHASE VCO VARIABLE | 3B |  |
| 2C | LEAD PHASE VCO VARIABLE | 3C |  |
| 2D | LAG PHASE VCO VARIABLE | 3D |  |
| 2E | SEARCH STATUS 0=TIMEOUT | 3E |  |
| 2F | WATCHDOG CNTR | 3F |  |

```
                    -10-
              RSUCESS MEMORY MAP

ADDR      CONTENT       ADDR      CONTENT 40                      50
    41                      51
    42                      52
    43                      53
    44                      54
    45                      55
    46                      56
    47                      57
    48                      58
    49                      59
    4A                      5A
    4B                      5B
    4C                      5C
    4D                      5D
    4E                      5E
    4F                      5F

ADDR      CONTENT       ADDR      CONTENT 60                      70
    61                      71
    62                      72
    63                      73
    64                      74
    65                      75
    66                      76
    67                      77
    68                      78
    69                      79
    6A                      7A
    6B                      7B
    6C                      7C
    6D                      7D
    6E                      7E
    6F                      7F
```

-11-

RSUCESS MEMORY MAP

| ADDR | CONTENT | ADDR | CONTENT |
|------|---------|------|---------|
| 80 | | 90 | |
| 81 | | 91 | |
| 82 | | 92 | |
| 83 | | 93 | |
| 84 | | 94 | |
| 85 | | 95 | |
| 86 | | 96 | |
| 87 | | 97 | |
| 88 | | 98 | |
| 89 | | 99 | |
| 8A | | 9A | |
| 8B | | 9B | |
| 8C | | 9C | |
| 8D | | 9D | |
| 8E | | 9E | |
| 8F | | 9F | |

| ADDR | CONTENT | ADDR | CONTENT |
|------|---------|------|---------|
| A0 | | B0 | |
| A1 | | B1 | |
| A2 | | B2 | |
| A3 | | B3 | |
| A4 | | B4 | |
| A5 | | B5 | |
| A6 | | B6 | |
| A7 | | B7 | |
| A8 | | B8 | |
| A9 | | B9 | |
| AA | | BA | |
| AB | | BB | |
| AC | | BC | |
| AD | | BD | |
| AE | | BE | |
| AF | | BF | |

```
                       -12-
                  RSUCESS MEMORY MAP

ADDR       CONTENT        ADDR       CONTENT

C0                        D0
      C1                        D1
      C2                        D2
      C3                        D3
      C4                        D4
      C5                        D5
      C6                        D6
      C7                        D7
      C8                        D8
      C9                        D9
      CA                        DA
      CB                        DB
      CC                        DC
      CD                        DD
      CE                        DE
      CF                        DF

ADDR       CONTENT        ADDR       CONTENT

E0                        F0
      E1                        F1
      E2                        F2
      E3                        F3
      E4                        F4
      E5                        F5
      E6                        F6
      E7                        F7
      E8                        F8
      E9                        F9
      EA                        FA
      EB                        FB
      EC                        FC
      ED                        FD
      EE                        FE
      EF                        FF

FILE NAME:    RSUCESSMAP
```

```
                            -13-
                    ; ----------------------------------------
                    ; NSUCESS.ASM MAIN PROGRAM    3-31-94
                    ; ----------------------------------------

;%S

NSUCESS:

ORG  OH                  ; INITIALIZE PROGRAM

SJMP PWRUP         ; JMP TO PWRUP ROUTINE

ORG 03H

LJMP IINTO         ; JMP TO INTO SERVICE ROUTINE
ORG 30H                  ; PASS INTRPT VECTORS,START CODE

PWRUP:                   ; BEGINNING OF PROGRAM

MOV R0,#29H
      MOV @R0,#OH

; CONFIG INTRPT REGS

MOV P2,#OH         ; INITIALIZE MUX

CLR P3.3           ; CLR RX CLK ENABLE
      CLR P3.4           ; CLR TX CLK ENABLE

SETB P2.7          ; RESET FPGA
      CLR P2.7

LCALL CLRDVR       ; CLR LEDS

LCALL FAULTON      ; TURNON FAULT INDICATOR

LCALL SELECT       ; READ ROTARY SWITCH FOR CONFIGURATION

LCALL CSELECT      ; READ CHIP RATE FROM FRONT PANEL

LCALL RDYON

LCALL BAUD         ; CONFIGURE BUAD RATE GENERATOR

LCALL TPRNGEN      ; CONFIGURE XMIT PRNGEN

LCALL RPRNGEN      ; CONFIGURE RCVR PRNGEN
```

-14-

```
        SETB P3.3           ; ENABLE RX CLK
        SETB P3.4           ; ENABLE TX CLK

LJMP BOB
        LCALL ENINTO        ; ENABLE INTO
BOB:
        LJMP SEARCH         ; INITIAL SEARCH MODE

; ----------------------------------
                            ; TEST SELECTION
                            ; ----------------------------------
SELECT:

LCALL CLRDVR        ; TURN OFF ALL INDICATORS

MOV P0,#0FFH        ; CONFIG P0 TO READ DTA

MOV P2,#0CH         ; READ ROTORY SWITCH
        MOV A,P0
        ANL A,#0FH          ; MASK UPPER BITS

MOV R2,A
        MOV P2,#0H          ; REINITIALIZE MUX

; TEST FOR CONFIGURATION VARIABLE

MOV A,R2            ; FETCH VARIABLE

XRL A,#0FH          ; TEST FOR CONFIG #1
        JNZ SELECT1
        LJMP CONFIG0

SELECT1:

MOV A,R2            ; FETCH VARIABLE
        XRL A,#0EH          ; TEST FOR CONFIG #2
        JNZ SELECT2
        LJMP CONFIG1

SELECT2:
```

```
        MOV A,R2            ; FETCH VARIABLE
        XRL A,#0DH          ; TEST FOR CONFIG #3
        JNZ SELECT3
        LJMP CONFIG2

SELECT3:

MOV A,R2            ; FETCH VARIABLE
        XRL A,#0CH          ; TEST FOR CONFIG #4
        JNZ SELECT4
        LJMP CONFIG3

SELECT4:

MOV A,R2            ; FETCH VARIABLE
        XRL A,#0BH          ; TEST FOR CONFIG #5
        JNZ SELECT5
        LJMP CONFIG4

SELECT5:

MOV A,R2            ; FETCH VARIABLE
        XRL A,#0AH          ; TEST FOR CONFIG #6
        JNZ SELECT6
        LJMP CONFIG5

SELECT6:

MOV A,R2            ; FETCH VARIABLE
        XRL A,#09H          ; TEST FOR CONFIG #7
        JNZ SELECT7
        LJMP CONFIG6

SELECT7:

MOV A,R2            ; FETCH VARIABLE
        XRL A,#08H          ; TEST FOR CONFIG #8
        JNZ SELECT8
        LJMP CONFIG7

SELECT8:

MOV A,R2            ; FETCH VARIABLE
        XRL A,#07H          ; TEST FOR CONFIG #9
        JNZ SELECT9
        LJMP CONFIG8

SELECT9:

LJMP CONFIG9

CONFIG0:                    ; CONFIGURATION #0
```

-15-

```
        MOV  R0,#20H      ; SET SEED MSB ADDR
        MOV  @R0,#0H      ; WRITE SEED MSB VARIABLE

MOV  R0,#21H      ; SET SEED LSB ADDR
        MOV  @R0,#0H      ; WRITE SEED LSB VARIABLE

MOV  R0,#22H      ; SET RCVR PRNGEN CONFIG ADDR
        MOV  @R0,#1FH     ; WRITE CONFIG VARIABLE   Y1=8   Y2=12

MOV  R0,#23H      ; SET XMITR PRNGEN CONFIG ADDR
        MOV  @R0,#1FH     ; WRITE CONFIG VARIABLE   Y1=8   Y2=12

MOV  R0,#24H      ; SET BAUD RATE MSB CONFIG ADDR
        MOV  @R0,#03H     ; WRITE MSB BAUD RATE VARIABLE   F=2.4K

MOV  R0,#25H      ; SET BAUD RATE LSB CONFIG ADDR
        MOV  @R0,#8EH     ; WRITE LSB BAUD RATE VARIABLE   F=2.4K

MOV  R0,#26H      ; SET RCVR CYCLE LENGTH MSB   L=28
        MOV  @R0,#02H

MOV  R0,#27H      ; SET RCVR CYCLE LENGTH LSB
        MOV  @R0,#0E2H

RET

CONFIG1:                  ; CONFIGURATION #1

MOV  R0,#20H      ; SET SEED MSB ADDR
        MOV  @R0,#0H      ; WRITE SEED MSB VARIABLE

MOV  R0,#21H      ; SET SEED LSB ADDR
        MOV  @R0,#01H     ; WRITE SEED LSB VARIABLE

MOV  R0,#22H      ; SET RCVR PRNGEN CONFIG ADDR
        MOV  @R0,#0DH     ; WRITE CONFIG VARIABLE   Y1=6   Y2=10

MOV  R0,#23H      ; SET XMITR PRNGEN CONFIG ADDR
        MOV  @R0,#0DH     ; WRITE CONFIG VARIABLE   Y1=6   Y2=10

MOV  R0,#24H      ; SET BAUD RATE MSB CONFIG ADDR
        MOV  @R0,#03H     ; WRITE MSB BAUD RATE VARIABLE   F=2.4K

MOV  R0,#25H      ; SET BAUD RATE LSB CONFIG ADDR
        MOV  @R0,#8EH     ; WRITE LSB BAUD RATE VARIABLE   F=2.4K

MOV  R0,#26H      ; SET RCVR CYCLE LENGTH MSB   L=60
        MOV  @R0,#02H
```

-16-

-17-

```
        MOV  R0,#27H          ; SET RCVR CYCLE LENGTH LSB
        MOV  @R0,#0E2H

RET

CONFIG2:                      ; CONFIGURATION #2

MOV  R0,#20H           ; SET SEED MSB ADDR
        MOV  @R0,#0H           ; WRITE SEED MSB VARIABLE

MOV  R0,#21H           ; SET SEED LSB ADDR

MOV  @R0,#01H          ; WRITE SEED LSB VARIABLE

MOV  R0,#22H           ; SET RCVR PRNGEN CONFIG ADDR
        MOV  @R0,#14H          ; WRITE CONFIG VARIABLE   Y1=5   Y2=11

MOV  R0,#23H           ; SET XMITR PRNGEN CONFIG ADDR
        MOV  @R0,#14H          ; WRITE CONFIG VARIABLE   Y1=5   Y2=11

MOV  R0,#24H           ; SET BAUD RATE MSB CONFIG ADDR
        MOV  @R0,#03H          ; WRITE MSB BAUD RATE VARIABLE  F=2.4K

MOV  R0,#25H           ; SET BAUD RATE LSB CONFIG ADDR
        MOV  @R0,#8EH          ; WRITE LSB BAUD RATE VARIABLE  F=2.4K

MOV  R0,#26H           ; SET RCVR CYCLE LENGTH MSB L=110
        MOV  @R0,#02H

MOV  R0,#27H           ; SET RCVR CYCLE LENGTH LSB
        MOV  @R0,#0E2H

RET

CONFIG3:                      ; CONFIGURATION #3

MOV  R0,#20H           ; SET SEED MSB ADDR
        MOV  @R0,#0H           ; WRITE SEED MSB VARIABLE

MOV  R0,#21H           ; SET SEED LSB ADDR
        MOV  @R0,#01H          ; WRITE SEED LSB VARIABLE

MOV  R0,#22H           ; SET RCVR PRNGEN CONFIG ADDR
        MOV  @R0,#27H          ; WRITE CONFIG VARIABLE   Y1=8   Y2=13

MOV  R0,#23H           ; SET XMITR PRNGEN CONFIG ADDR
        MOV  @R0,#27H          ; WRITE CONFIG VARIABLE   Y1=8   Y2=13
```

```
                            -18-
    MOV R0,#24H          ; SET BAUD RATE MSB CONFIG ADDR

MOV @R0,#03H         ; WRITE MSB BAUD RATE VARIABLE   F=2.4K

MOV R0,#25H          ; SET BAUD RATE LSB CONFIG ADDR
    MOV @R0,#8EH         ; WRITE LSB BAUD RATE VARIABLE   F=2.4K

MOV R0,#26H          ; SET RCVR CYCLE LENGTH MSB   L=1785
    MOV @R0,#02H

MOV R0,#27H          ; SET RCVR CYCLE LENGTH LSB
    MOV @R0,#0E2H

RET

CONFIG4:                 ; CONFIGURATION #4

MOV R0,#20H          ; SET SEED MSB ADDR
    MOV @R0,#0H          ; WRITE SEED MSB VARIABLE

MOV R0,#21H          ; SET SEED LSB ADDR
    MOV @R0,#03H         ; WRITE SEED LSB VARIABLE

MOV R0,#22H          ; SET RCVR PRNGEN CONFIG ADDR
    MOV @R0,#0FH         ; WRITE CONFIG VARIABLE   Y1=4  Y2=9

MOV R0,#23H          ; SET XMITR PRNGEN CONFIG ADDR

MOV @R0,#0FH         ; WRITE CONFIG VARIABLE   Y1=4  Y2=9

MOV R0,#24H          ; SET BAUD RATE MSB CONFIG ADDR

MOV @R0,#03H         ; WRITE MSB BAUD RATE VARIABLE   F=2.4K

MOV R0,#25H          ; SET BAUD RATE LSB CONFIG ADDR
    MOV @R0,#8EH         ; WRITE LSB BAUD RATE VARIABLE   F=2.4K

MOV R0,#26H          ; SET RCVR CYCLE LENGTH MSB   L=7905
    MOV @R0,#02H

MOV R0,#27H          ; SET RCVR CYCLE LENGTH LSB
    MOV @R0,#0E2H

RET

CONFIG5:                 ; CONFIGURATION #5

MOV R0,#20H          ; SET SEED MSB ADDR
    MOV @R0,#0H          ; WRITE SEED MSB VARIABLE
```

```
                            -19-
    MOV  R0,#21H        ; SET SEED LSB ADDR
    MOV  @R0,#03H       ; WRITE SEED LSB VARIABLE

MOV  R0,#22H        ; SET RCVR PRNGEN CONFIG ADDR
    MOV  @R0,#37H       ; WRITE CONFIG VARIABLE   Y1=8   Y2=15

MOV  R0,#23H        ; SET XMITR PRNGEN CONFIG ADDR

MOV  @R0,#37H       ; WRITE CONFIG VARIABLE   Y1=8   Y2=15

MOV  R0,#24H        ; SET BAUD RATE MSB CONFIG ADDR

MOV  @R0,#03H       ; WRITE MSB BAUD RATE VARIABLE   F=2.4K

MOV  R0,#25H        ; SET BAUD RATE LSB CONFIG ADDR
    MOV  @R0,#8EH       ; WRITE LSB BAUD RATE VARIABLE   F=2.4K

MOV  R0,#26H        ; SET RCVR CYCLE LENGTH MSB   L=7905
    MOV  @R0,#02H

MOV  R0,#27H        ; SET RCVR CYCLE LENGTH LSB
    MOV  @R0,#0E2H

RET

CONFIG6:                ; CONFIGURATION #6

MOV  R0,#20H        ; SET SEED MSB ADDR
    MOV  @R0,#0H        ; WRITE SEED MSB VARIABLE

MOV  R0,#21H        ; SET SEED LSB ADDR
    MOV  @R0,#01H       ; WRITE SEED LSB VARIABLE

MOV  R0,#22H        ; SET RCVR PRNGEN CONFIG ADDR
    MOV  @R0,#0FH       ; WRITE CONFIG VARIABLE   Y1=8   Y2=10

MOV  R0,#23H        ; SET XMITR PRNGEN CONFIG ADDR

MOV  @R0,#0FH       ; WRITE CONFIG VARIABLE   Y1=8   Y2=10

MOV  R0,#24H        ; SET BAUD RATE MSB CONFIG ADDR

MOV  @R0,#03H       ; WRITE MSB BAUD RATE VARIABLE   F=2.4K

MOV  R0,#25H        ; SET BAUD RATE LSB CONFIG ADDR
    MOV  @R0,#8EH       ; WRITE LSB BAUD RATE VARIABLE   F=2.4K
```

```
                           -20-
    MOV R0,#26H        ; SET RCVR CYCLE LENGTH MSB   L=7905
    MOV @R0,#02H

MOV R0,#27H        ; SET RCVR CYCLE LENGTH LSB
    MOV @R0,#0E2H

RET

CONFIG7:               ; CONFIGURATION #7

MOV R0,#20H        ; SET SEED MSB ADDR
    MOV @R0,#0H        ; WRITE SEED MSB VARIABLE

MOV R0,#21H        ; SET SEED LSB ADDR
    MOV @R0,#03H       ; WRITE SEED LSB VARIABLE

MOV R0,#22H        ; SET RCVR PRNGEN CONFIG ADDR
    MOV @R0,#25H       ; WRITE CONFIG VARIABLE   Y1=6   Y2=13

MOV R0,#23H        ; SET XMITR PRNGEN CONFIG ADDR

MOV @R0,#25H       ; WRITE CONFIG VARIABLE   Y1=6   Y2=13

MOV R0,#24H        ; SET BAUD RATE MSB CONFIG ADDR

MOV @R0,#03H       ; WRITE MSB BAUD RATE VARIABLE   F=2.4K

MOV R0,#25H        ; SET BAUD RATE LSB CONFIG ADDR
    MOV @R0,#8EH       ; WRITE LSB BAUD RATE VARIABLE   F=2.4K

MOV R0,#26H        ; SET RCVR CYCLE LENGTH MSB   L=7905
    MOV @R0,#02H

MOV R0,#27H        ; SET RCVR CYCLE LENGTH LSB
    MOV @R0,#0E2H

RET

CONFIG8:               ; CONFIGURATION #8

MOV R0,#20H        ; SET SEED MSB ADDR
    MOV @R0,#0H        ; WRITE SEED MSB VARIABLE

MOV R0,#21H        ; SET SEED LSB ADDR
    MOV @R0,#01H       ; WRITE SEED LSB VARIABLE
```

```
                            -21-
    MOV  R0,#22H          ; SET RCVR PRNGEN CONFIG ADDR
    MOV  @R0,#24H         ; WRITE CONFIG VARIABLE   Y1=5  Y2=13

MOV  R0,#23H          ; SET XMITR PRNGEN CONFIG ADDR

MOV  @R0,#24H         ; WRITE CONFIG VARIABLE   Y1=5  Y2=13

MOV  R0,#24H          ; SET BAUD RATE MSB CONFIG ADDR

MOV  @R0,#03H         ; WRITE MSB BAUD RATE VARIABLE   F=2.4K

MOV  R0,#25H          ; SET BAUD RATE LSB CONFIG ADDR
    MOV  @R0,#8EH         ; WRITE LSB BAUD RATE VARIABLE   F=2.4K

MOV  R0,#26H          ; SET RCVR CYCLE LENGTH MSB   L=7905
    MOV  @R0,#02H

MOV  R0,#27H          ; SET RCVR CYCLE LENGTH LSB
    MOV  @R0,#0E2H

RET

CONFIG9:                  ; CONFIGURATION #9

MOV  R0,#20H          ; SET SEED MSB ADDR
    MOV  @R0,#0H          ; WRITE SEED MSB VARIABLE

MOV  R0,#21H          ; SET SEED LSB ADDR
    MOV  @R0,#01H         ; WRITE SEED LSB VARIABLE

MOV  R0,#22H          ; SET RCVR PRNGEN CONFIG ADDR
    MOV  @R0,#27H         ; WRITE CONFIG VARIABLE   Y1=8  Y2=13

MOV  R0,#23H          ; SET XMITR PRNGEN CONFIG ADDR

MOV  @R0,#27H         ; WRITE CONFIG VARIABLE   Y1=8  Y2=13

MOV  R0,#24H          ; SET BAUD RATE MSB CONFIG ADDR

MOV  @R0,#03H         ; WRITE MSB BAUD RATE VARIABLE   F=2.4K

MOV  R0,#25H          ; SET BAUD RATE LSB CONFIG ADDR
    MOV  @R0,#8EH         ; WRITE LSB BAUD RATE VARIABLE   F=2.4K
```

```
                              -22-
    MOV R0,#26H        ; SET RCVR CYCLE LENGTH MSB   L=7905
    MOV @R0,#02H

MOV R0,#27H        ; SET RCVR CYCLE LENGTH LSB
    MOV @R0,#0E2H

RET

; ----------------------------------
                       ; END OF TEST SELECTION
                       ; ----------------------------------

; ----------------------------------
                       ; CLEAR LED DRIVER SUBROUTINE
                       ; ----------------------------------

CLRDVR:

MOV P0,#0H         ; CLR FAULT INDICATOR
    MOV P2,#0DH        ; WRITE TO DRVR
    MOV P2,#0H

MOV P0,#01H        ; CLR RDY INDICATOR
    MOV P2,#0DH        ; WRITTE TO DRVR
    MOV P2,#0H

MOV P0,#02H        ; CLR SEARCH INDICATOR
    MOV P2,#0DH        ; WRITTE TO DRVR
    MOV P2,#0H

MOV P0,#03H        ; CLR SYNC INDICATOR
    MOV P2,#0DH        ; WRITTE TO DRVR
    MOV P2,#0H

RET

; ----------------------------------
                       ; END OF CLEAR LED DRIVER SUBROUTINE
                       ; ----------------------------------
```

-23-

```
;---------------------------------------
; TURN ON FAULT INDICATOR
;---------------------------------------

FAULTON:

MOV P0,#08H         ; SET FAULT INDICATOR
        MOV P2,#0DH         ; WRITE TO DRVR

MOV P2,#0H

RET
;---------------------------------------
; END OF TURN ON FAULT INDICATOR
;---------------------------------------

;---------------------------------------
; TURN OFF FAULT INDICATOR
;---------------------------------------

FAULTOFF:

MOV P0,#0H          ; CLR FAULT INDICATOR
        MOV P2,#0DH         ; WRITE TO DRVR
        MOV P2,#0H

RET
;---------------------------------------
; END OF TURN OFF FAULT INDICATOR
;---------------------------------------

;---------------------------------------
; TURN ON RDY INDICATOR
;---------------------------------------

RDYON:

MOV P0,#09H         ; SET RDY INDICATOR
        MOV P2,#0DH         ; WRITE TO DRVR
        MOV P2,#0H

RET
```

```
                                        -24-
                        ;   ---------------------------------
                        ;   END OF TURN ON RDY INDICATOR
                        ;   ---------------------------------

;   ---------------------------------
                        ;   TURN OFF RDY INDICATOR
                        ;   ---------------------------------

RDYOFF:

MOV P0,#01H         ; CLR RDY INDICATOR
    MOV P2,#0DH         ; WRITE TO DRVR
    MOV P2,#0H

RET

;   ---------------------------------
                        ;   END OF TURN OFF RDY INDICATOR
                        ;   ---------------------------------

;   ---------------------------------
                        ;   TURN ON SEARCH INDICATOR
                        ;   ---------------------------------

SEARCHON:

MOV P0,#0AH         ; SET SEARCH INDICATOR
    MOV P2,#0DH         ; WRITE TO DRVR
    MOV P2,#0H

RET

;   ---------------------------------
                        ;   END OF TURN ON SEARCH INDICATOR
                        ;   ---------------------------------

;   ---------------------------------
                        ;   TURN OFF SEARCH INDICATOR
                        ;   ---------------------------------

SEARCHOFF:
```

```
                                    -25-
        MOV  P0,#02H            ; CLR SEARCH INDICATOR
        MOV  P2,#0DH            ; WRITE TO DRVR
        MOV  P2,#0H

RET

; ------------------------------------
                                ; END OF TURN OFF SEARCH INDICATOR
                                ; ------------------------------------

; ------------------------------------
                                ; TURN ON SYNC INDICATOR
                                ; ------------------------------------
SYNCON:

MOV  P0,#0BH            ; SET SYNC INDICATOR
        MOV  P2,#0DH            ; WRITE TO DRVR
        MOV  P2,#0H

RET

; ------------------------------------
                                ; END OF TURN ON SYNC INDICATOR
                                ; ------------------------------------

; ------------------------------------
                                ; TURN OFF SYNC INDICATOR
                                ; ------------------------------------
SYNCOFF:

MOV  P0,#03H            ; CLR SYNC INDICATOR
        MOV  P2,#0DH            ; WRITE TO DRVR
        MOV  P2,#0H

RET

; ------------------------------------
                                ; END OF TURN OFF SYNC INDICATOR
                                ; ------------------------------------
```

-26-
```
;   ----------------------------
;   WRITE DTA TO FPGA
;   ----------------------------

WRTDTA:

CLR C

MOV R4,#08H         ; SET BIT CNTR

WRTDTA1:

MOV A,R1            ; FETCH WRTDTA
        RLC A               ; SHIFT LEFT (MSB FIRST)
        JC WRTDTA2          ; JMP IF BIT SET

MOV R1,A            ; RETURN SHIFTED DTA
        CLR P2.4            ; TX LOW BIT

LJMP WRTDTA3

WRTDTA2:

MOV R1,A            ; RETURN SHIFTED DTA

SETB P2.4           ; TX HIGH BIT

WRTDTA3:

SETB P2.5           ; CLK DTA
        LCALL CLKDLY
        CLR P2.5
        LCALL CLKDLY

DJNZ R4,WRTDTA1

RET

;   ----------------------------
;   WRITE DTA TO FPGA
;   ----------------------------

;   ----------------------------
;   DTA CLK DELAY
;   ----------------------------

CLKDLY:
```

```
                                    -27-
        MOV R7,#8FH                 ; 250 uSEC DLY

CLKDLY1:
        DJNZ R7,CLKDLY1

RET
                                    ; ------------------------------
                                    ; END OF DTA CLK DELAY
                                    ; ------------------------------

; ------------------------------
                                    ; CONFIG BAUD RATE GEN
                                    ; ------------------------------

BAUD:

MOV P2,#06H                 ; ENABLE LOADING OF BAUD RATE GEN

MOV R0,#24H                 ; SET MSB BUAD RATE VARIABLE ADDR
        MOV A,@R0                   ; FETCH BAUD RATE VARIABLE
        MOV R1,A
        LCALL WRTDTA                ; WRITE TO GENERATOR

MOV R0,#25H                 ; SET LSB BUAD RATE VARIABLE ADDR

MOV A,@R0                   ; FETCH BAUD RATE VARIABLE
        MOV R1,A
        LCALL WRTDTA                ; WRITE TO GENERATOR

MOV P2,#0H                  ; DISABLE LOADING OF BAUD RATE GEN

RET
                                    ; ------------------------------
                                    ; END OF CONFIG BAUD RATE GEN
                                    ; ------------------------------

; ------------------------------
                                    ; CONFIG TRANSMIT PRNGEN
                                    ; ------------------------------

TPRNGEN:

MOV P2,#05H                 ; ENABLE LOADING OF PRNGEN CONFIG

MOV R0,#23H                 ; SET CONFIG VARIABLE ADDR
```

```
                                -28-
        MOV A,@R0           ; FETCH CONFIG VARIABLE
        MOV R1,A
        LCALL WRTDTA        ; WRITE TO GENERATOR

MOV P2,#0H          ; DISABLE PRNCONFIG

MOV P2,#04H         ; ENABLE SEEDING OF PRNGEN

MOV R0,#20H         ; SET MSB SEED VARIABLE ADDR
        MOV A,@R0           ; FETCH MSB SEED VARIABLE
        MOV R1,A
        LCALL WRTDTA        ; WRITE TO GENERATOR

MOV R0,#21H         ; SET LSB SEED VARIABLE ADDR
        MOV A,@R0           ; FETCH SEED VARIABLE

MOV R1,A
        LCALL WRTDTA        ; WRITE TO GENERATOR

MOV P2,#0H          ; DISABLE SEEDING OF PRNGEN

RET

; ----------------------------------
                            ; END OF CONFIG TRANSMIT PRNGEN
                            ; ----------------------------------

; ----------------------------------
                            ; CONFIG RECEIVER PRNGENS
                            ; ----------------------------------

RPRNGEN:

MOV P2,#03H         ; ENABLE LOADING OF PRNGEN CONFIG

MOV R0,#22H         ; SET CONFIG VARIABLE ADDR
        MOV A,@R0           ; FETCH CONFIG VARIABLE
        MOV R1,A
        LCALL WRTDTA        ; WRITE TO GENERATOR

MOV P2,#0H          ; DISABLE PRNCONFIG

MOV P2,#02H         ; ENABLE SEEDING OF PRNGEN

MOV R0,#20H         ; SET MSB SEED VARIABLE ADDR
        MOV A,@R0           ; FETCH MSB SEED VARIABLE
        MOV R1,A
        LCALL WRTDTA        ; WRITE TO GENERATOR
```

-29-

```
        MOV R0,#21H         ; SET LSB SEED VARIABLE ADDR
        MOV A,@R0           ; FETCH SEED VARIABLE
        MOV R1,A
        LCALL WRTDTA        ; WRITE TO GENERATOR

MOV P2,#0H          ; DISABLE SEEDING OF PRNGEN

RET

; ----------------------------------
        ; END OF CONFIG RECEIVE PRNGENS
        ; ----------------------------------
        ; ----------------------------------
        ; INITIAL THRESHOLD DETECTION
        ; ----------------------------------

ITHRESH:

MOV P0,#0FFH        ; CONFIGURE PORT TO READ

ITHRESH2:
ITHRESH3:

CLR P1.5            ; ENABLE OPHASE A/D

CLR P1.0            ; START CONVERSION

ITHRESH1:

MOV A,P1            ; READ A/D FOR COMPLETED CONVERSION
        JNB ACC.2,ITHRESH1  ; JMP IF BIT NOT SET

MOV A,P0            ; READ DATA

SETB P1.0           ; END CONVERSION

SETB P1.5           ; DISABLE OPHASE A/D

MOV R2,A            ; STORE RESULT INTO R2
```

-30-

```
IHIGHTEST:
    CLR  C
    MOV  A,R2           ; GET A/D RESULT
    SUBB A,#8DH         ; TEST HIGH THRESH LEVEL 2.75V
    JNC  IHIGHTEST1     ; JMP IF ABOVE 2.75V

LJMP ISHIFT

IHIGHTEST1:
    LCALL SYNCON
    LCALL SEARCHOFF

LJMP ITHRESH

ISHIFT:

SETB P2.6           ; CHIP RETARD
    NOP
    CLR  P2.6

LCALL ITHRSTIMR

LJMP ITHRESH2

; ------------------------------
                        ; END OF INITIAL THRESHOLD DETECTION
                        ; ------------------------------

; ------------------------------
                        ; INITIAL THRESHOLD TIMER SUBROUTINE
                        ; ------------------------------

ITHRSTIMR:
                        ; 250 uSEC SHIFT DELAY
```

-31-

```
        MOV R0,#0FFH
        DJNZ R0,$

MOV R0,#0FFH
        DJNZ R0,$

RET
```

```
; ---------------------------------
; END OF INITIAL THRESHOLD TIMER
; ---------------------------------
```

```
; ---------------------------------
; WRITE TO DAC
; ---------------------------------
```

```
DAC:
        MOV P0,R7          ; WRITE TO DAC

MOV P2,#0EH        ; SELECT DAC U3

CLR P3.7           ; WRITE TO DAC
        SETB P3.7

MOV P2,#0H         ; DESELECT DAC U3

RET
```

```
; ---------------------------------
; END OF WRITE TO DAC
; ---------------------------------

; ---------------------------------
; ENABLE INTO INTERRUPT
; ---------------------------------
```

```
ENINTO:
        MOV IP,#01H        ; SET INTO AS HIGH PRIORITY INTRPT

MOV TCON,#01H      ; CONFIG INTO FOR FALLING EDGE INTRPT

MOV R0,#29H        ; SET INTO STATUS ADDR
```

-32-

```
        MOV @R0,#0H           ; CLR INT0 STATUS

MOV IE,#81H           ; ENABLE INT0

RET

; ------------------------------------
; END OF ENABLE INT0 INTERRUPT
; ------------------------------------

; ------------------------------------
; INT0 VECTORING
; ------------------------------------

IINT0:

MOV IE,#01H           ; DISABLE INT0

; DEBOUNCE ENTR SWITCH

MOV R0,#0FH
INT01:
        MOV R1,#0FFH
INT02:
        DJNZ R1,INT02

DJNZ R0,INT01

; READ INT0

MOV A,P3
        JNB P3.2,INT03

MOV IE,#81H           ; ENABLE INT0

RETI

INT03:

MOV R0,#29H           ; SET INT0 INTRP STATUS
        MOV @R0,#01H
```

```
        MOV IE,#81H         ; ENABLE INTO

RETI
                            ;----------------------------------
                            ; END OF INTO VECTORING
                            ;----------------------------------

;----------------------------------
                            ; 1 SEC DELAY
                            ;----------------------------------
DELAY:

MOV R6,#0AFH
DELAY2:
        MOV R5,#0FFH
DELAY3:
        DJNZ R5,DELAY3
        DJNZ R6,DELAY2

RET
                            ;----------------------------------
                            ; END OF 1 SEC DELAY
                            ;----------------------------------

;----------------------------------
                            ; VCO CONTROL
                            ;----------------------------------

VCO:

MOV R0,#28H         ; FETCH VCO VARIABLE
        MOV A,@R0
        MOV R7,A
        LCALL DAC           ; WRITE TO VCO

RET
```

-33-

```
                            -34-
                    ; --------------------------------
                    ; END OF VCO CONTROL
                    ; --------------------------------

; --------------------------------
                    ; ERROR TEST
                    ; --------------------------------
NERROR:

LCALL FAULTON
       LJMP LOOP

; --------------------------------
                    ; END OF ERROR TEST
                    ; --------------------------------

LOOP:
       LJMP LOOP

; --------------------------------
                    ; SEARCH SUBROUTINE
                    ; --------------------------------
SEARCH:

LCALL SYNCOFF       ; TURN OFF SYNC INDICATOR
       LCALL SEARCHON      ; TURN ON SEARCH INDICATOR

SEARCH1:
```

-35-

```
        LJMP ITHRESH

; ------------------------------
                                ; END OF SEARCH SUBROUTINE
                                ; ------------------------------

; ------------------------------
                                ; TRACKING ROUTINE
                                ; ------------------------------
TRACK:
        MOV P0,#0FFH            ; CONFIG P0 THE READ
        MOV R5,#08H
TRACK8:
        MOV R4,#0FFH
TRACK5:
                                ; READ LEAD PHASE DETECTOR

CLR P1.4                ; ENABLE LEAD PHASE A/D

CLR P1.0                ; START CONVERSION
TRACK2:
        MOV A,P1                ; READ A/D FOR COMPLETED CONVERSION
        JNB ACC.1,TRACK2        ; JMP IF BIT NOT SET

MOV A,P0                ; READ DATA

SETB P1.0               ; END CONVERSION

SETB P1.4               ; DISABLE LEAD PHASE A/D

MOV R2,A                ; STORE RESULT INTO R2

; READ LAG PHASE DETECTOR

CLR P1.6                ; ENABLE LAG PHASE A/D

CLR P1.0                ; START CONVERSION
```

-36-

```
TRACK3:

MOV A,P1            ; READ A/D FOR COMPLETED CONVERSION
    JNB ACC.3,TRACK3    ; JMP IF BIT NOT SET

MOV A,P0            ; READ DATA

SETB P1.0           ; END CONVERSION

SETB P1.6           ; DISABLE LEAD PHASE A/D

MOV R3,A            ; STORE RESULT INTO R3

; TEST FOR LOCK STATUS

; TEST LEAD VS LAG

CLR C
    MOV A,R2
    SUBB A,R3
    JC TRACK4           ; JMP IF LAG IS LARGER

MOV R0,#28H
    MOV A,@R0
    SUBB A,#08H         ; DECREASE VCO VOLTAGE
    MOV @R0,A
    MOV R7,A
    LCALL DAC
    LJMP TRACK6

TRACK4:

MOV R0,#28H
    MOV A,@R0
    ADD A,#08H          ; INCREASE VCO VOLTAGE
    MOV @R0,A
    MOV R7,A
    LCALL DAC

TRACK6:

; TEST FOR GOOD THRESHOLD LEVEL

DJNZ R4,TRACK5
    DJNZ R5,TRACK8

; READ 0 PHASE DETECTOR

CLR P1.5            ; ENABLE OPHASE A/D
```

```
                                    -37-
        CLR P1.0              ; START CONVERSION

TRACK1:

MOV A,P1              ; READ A/D FOR COMPLETED CONVERSION
        JNB ACC.2,TRACK1      ; JMP IF BIT NOT SET

MOV A,P0              ; READ DATA

SETB P1.0             ; END CONVERSION

SETB P1.5             ; DISABLE OPHASE A/D

CLR C
        SUBB A,#8DH           ; THRESH LEVEL 2.75V
        JNC TRACK7

LJMP SEARCH           ; THRESH BELOW 2.75V

TRACK7:

LJMP TRACK

; ------------------------------
                              ; END OF TRACKING ROUTINE
                              ; ------------------------------

; -------------------------
                              ; TRACKING DELAY
                              ; -------------------------

TRKDLY:

MOV R5,#0FFH
        DJNZ R5,$
        RET

; -------------------------
                              ; END OF TRACKING DELAY
                              ; -------------------------

; --------------------------------
                              ; SELECT CHIP RATE FROM FRONT PANEL
                              ; --------------------------------
```

-38-

```
CSELECT:
        MOV P0,#0FFH        ; CONFIG P0 TO READ DTA

MOV P2,#0CH         ; READ ROTORY SWITCH
        MOV A,P0
        ANL A,#0F0H         ; MASK OFF LOWER BITS

MOV R2,A
        MOV P2,#0H          ; REINITIALIZE MUX

; TEST FOR CONFIGURATION VARIABLE

; ROTARY SWITCH=0
        MOV A,R2            ; FETCH VARIABLE
        XRL A,#0F0H
        JNZ CSELECT1        ; JMP IF NOT 0
        MOV R1,#03H         ; RX CHIP RATE = 4.915 MHZ
        MOV R3,#02H         ; TX CHIP RATE = 4.915 MHZ
        LJMP CSEL

CSELECT1:
                            ; ROTARY SWITCH=1
        MOV A,R2            ; FETCH VARIABLE
        XRL A,#0E0H
        JNZ CSELECT2        ; JMP IF NOT 0
        MOV R1,#07H         ; RX CHIP RATE = 2.457 MHZ
        MOV R3,#04H         ; TX CHIP RATE = 2.457 MHZ
        LJMP CSEL

CSELECT2:
                            ; ROTARY SWITCH=2
        MOV A,R2            ; FETCH VARIABLE
        XRL A,#0D0H
        JNZ CSELECT3        ; JMP IF NOT 0
        MOV R1,#0FH         ; RX CHIP RATE = 1.228 MHZ
        MOV R3,#08H         ; TX CHIP RATE = 1.228 MHZ
        LJMP CSEL

CSELECT3:
                            ; ROTARY SWITCH=3
        MOV A,R2            ; FETCH VARIABLE

XRL A,#0C0H
        JNZ CSELECT4        ; JMP IF NOT 0
        MOV R1,#13H         ; RX CHIP RATE = 1.000 MHZ
        MOV R3,#0AH         ; TX CHIP RATE = 1.000 MHZ
        LJMP CSEL

CSELECT4:
```

```
                                        -39-
                                ; ROTARY SWITCH=4
        MOV A,R2                ; FETCH VARIABLE
        XRL A,#0B0H
        JNZ CSELECT5            ; JMP IF NOT 0
        MOV R1,#1FH             ; RX CHIP RATE = 614 KHZ
        MOV R3,#10H             ; TX CHIP RATE = 614 KHZ
        LJMP CSEL

CSELECT5:
                                ; ROTARY SWITCH=5
        MOV A,R2                ; FETCH VARIABLE
        XRL A,#0A0H
        JNZ CSELECT6            ; JMP IF NOT 0
        MOV R1,#3FH             ; RX CHIP RATE= 312 KHZ
        MOV R3,#20H             ; TX CHIP RATE= 312 KHZ
        LJMP CSEL

CSELECT6:
                                ; ROTARY SWITCH=6
        MOV A,R2                ; FETCH VARIABLE
        XRL A,#90H
        JNZ CSELECT7            ; JMP IF NOT 0
        MOV R1,#7FH             ; RX CHIP RATE= 156 KHZ
        MOV R3,#40H             ; TX CHIP RATE= 156 KHZ
        LJMP CSEL

CSELECT7:
                                ; ROTARY SWITCH=7
        MOV A,R2                ; FETCH VARIABLE
        XRL A,#80H
        JNZ CSELECT8            ; JMP IF NOT 0
        MOV R1,#9DH             ; RX CHIP RATE= 128 KHZ
        MOV R3,#4FH             ; TX CHIP RATE= 128 KHZ
        LJMP CSEL

CSELECT8:
                                ; ROTARY SWITCH=8
        MOV A,R2                ; FETCH VARIABLE
        XRL A,#70H
        JNZ CSELECT9            ; JMP IF NOT 0
        MOV R1,#0C7H            ; RX CHIP RATE= 100 KHZ
        MOV R3,#64H             ; TX CHIP RATE= 100 KHZ
        LJMP CSEL

CSELECT9:
                                ; ROTARY SWITCH=9
        MOV R1,#0FFH            ; RX CHIP RATE= 78.8 KHZ
        MOV R3,#80H             ; TX CHIP RATE= 78.8 KHZ
```

```
                                        -40-
        LJMP CSEL

CSEL:
                            ; PROGRAM RX PRNGEN

MOV P2,#08H         ; ENABLE RX CHIP RATE GEN
        LCALL WRTDTA
        MOV P2,#0H          ; DISABLE CHIP RATE GEN

; PROGRAM TX PRNGEN

MOV R1,R3           ; LOAD TX SETTING INTO R1
        MOV P2,#09H         ; ENABLE TX CHIP RATE GEN
        LCALL WRTDTA
        MOV P2,#0H          ; DISABLE CHIP RATE GEN

RET
                            ; --------------------------
                            ; END OF SELECT CHIP RATE FROM FRONT PANEL
                            ; --------------------------

;%E

ENDS

END NSUCESS
```

The spread spectrum communication system described herein greatly increases the utility of a direct spread spectrum communication system design. The advantage of a programmable variable length code sequences and ultra-fast signal correlation allowed in the design permits the spread spectrum communication system to be used for non-direct communication and the length of the PN code to be changed even while receiving data. As the design can be used at any RF frequency and CHIP rate, the system can be tailored for use over any existing or future communications link any where in the world.

What is claimed is:

1. A spread spectrum communications system having a transmitter for transmitting a spread spectrum signal containing data and a digital code and a receiver for receiving the spread spectrum signal and for demodulating the spread spectrum signal with the same digital code, the improvement in said receiver comprising:
   a. means for selecting a base digital code identical to the digital code used by the transmitter,
   b. means for generating a leading digital code identical to the base digital code and leading the base digital code by a fixed phase shift,
   c. means for generating a lagging digital code identical to the base digital code and lagging the base digital code by the fixed phase shift,
   d. means for individually mixing the leading digital code, the base digital code, and the lagging digital code with the spread spectrum signal to thereby generate a leading information signal, a base information signal and a lagging information signal, respectively,
   e. means for comparing relative power levels of the leading information signal and the lagging information signal,
   f. feedback means for altering the rate at which the leading digital code, the base digital code and the lagging digital code are clocked based upon the relative power levels of the leading information signal and the lagging information signal until the respective power levels of the leading information signal and the lagging information signal are equal, and
   g. means for out-putting the base information signal once the respective power levels of the leading information signal and the lagging information signal are equal to thereby maximize the base information signal.

2. A spread spectrum communications system as described in claim 1 wherein said fixed phase shift introduced by said means for generating the leading digital code and said means for generating the lagging digital code is equal to one half cycle.

3. A spread spectrum communications system according to claim 1 wherein said means for selecting the base digital code selects a pseudo random code.

4. A spread spectrum communications system according to claim 1 wherein said means for generating the leading digital code and said means for generating the lagging digital code both clock the respective digital code at a predetermined chip rate.

5. A spread spectrum communications system according to claim 1 wherein said comparing means determines a difference between the relative power levels of the leading information signal and the lagging information signal.

6. A spread spectrum communications system according to claim 1 wherein said feedback means alters the rate at which the leading digital code, the base digital code and the lagging digital code are clocked in proportion to the difference between the relative power levels of the leading information signal and the lagging information signal.

7. A receiving system for receiving transmitted information including a transmitted PN code, the receiving system comprising:
   a. a receiving antenna for intercepting a transmitted radio frequency signal,
   b. a first mixer coupled to said antenna for mixing the intercepted signal with a locally derived oscillator signal tuned below the RF carrier of the transmitted frequency to generate an intermediate frequency signal,
   c. first means for generating a first digital PN Code sequence identical to the transmitted PN Code, said first generating means coupled to a clock generator for clocking said first digital PN Code sequence,
   d. first mixing means for mixing said first digital PN Code sequence with said intermediate frequency signal and generating a first output signal,
   e. first correlating means for correlating said first output signal and generating a first correlated signal,
   f. second means for generating a second digital PN Code sequence identical to the transmitted PN Code and leading said first digital PN Code sequence by a fixed phase shift, said second generating means coupled to the clock generator for clocking said second digital PN Code sequence,
   g. second mixing means for mixing said second digital PN Code sequence with said intermediate frequency signal and generating a second output signal,
   h. second correlating means for correlating said second output signal and generating a second correlated signal,
   i. third means for generating a third digital PN Code sequence identical to the transmitted PN Code and lagging said first digital PN Code sequence by the fixed phase shift, said third generating means coupled to the clock generator for clocking said third digital PN Code sequence,
   j. third mixing means for mixing said third digital PN Code sequence with said intermediate frequency signal and generating a third output signal,
   k. third correlating means for correlating said third output signal and generating a third correlated signal,
   l. threshold detecting means for detecting the energy of said second and third correlated signals,
   m. a phase locked loop coupled to said first correlating means for sensing the first correlated signal and for changing frequency to lock to the first correlated signal,
   n. a demodulator coupled to the phase locked loop for demodulating data from the first correlated signal,
   o. a microprocessing means for comparing the energy of said second and third correlated signals and generating a digital representation of the difference, said microprocessing means providing a digital command to said clock generator to alter the clock rate until said difference is zero, said microprocessing means also receiving the data from said demodulator and outputting said data to a data port, and
   p. means, responsive to said first mixing means, for band pass filtering said first output signal, said band pass filtering means centered at a carrier frequency.

8. A receiving system as described in claim 7 wherein said first, second and third correlating means include a chip rate retard/delay circuit.

9. A receiving system as described in claim 7 wherein said first, second and third digital PN Code generating means each comprise:

a. a programmable shift register adapted to receive a configuration signal and clocked by said clock generator, said programmable shift register outputting register information to a plurality of clocked multiplexers, wherein at least one of said multiplexers and said programmable shift register output a signal to a first exclusive OR gate, and b. a second exclusive OR gate for receiving the output from said first exclusive OR sate and the output of at least one other multiplexer and for providing an output which comprises the PN code to said programmable shift register.

10. A communications method comprising the steps of:

transmitting a spread spectrum signal containing data and a digital code;

receiving the spread spectrum signal; and demodulating the spread spectrum signal with the same digital code, said demodulating step comprising the steps of:
  generating a base digital code identical to the digital code of the transmitted spread spectrum signal;
  generating a leading digital code identical to the base digital code and leading the base digital code by a fixed phase shift,
  generating a lagging digital code identical to the base digital code and lagging the base digital code by the fixed phase shift,
  individually mixing the leading digital code, the base digital code, and the lagging digital code with the spread spectrum signal to thereby generate a leading information signal, a base information signal and a lagging information signal, respectively,
  comparing relative power levels of the leading information signal and the lagging information signal,
  altering the rate at which the leading digital code, the base digital code and the lagging digital code are clocked based upon the relative power levels of the leading information signal and the lagging information signal until the respective power levels of the leading information signal and the lagging information signal are equal, and
  outputting the base information signal once the respective power levels of the leading information signal and the lagging information signal are equal to thereby maximize the base information signal.

11. A communications method according to claim 10 wherein the fixed phase shift generated by said steps of generating the leading digital code and the lagging digital code each comprises one half cycle.

12. A communications method according to claim 10 wherein said steps of generating the leading digital code and the lagging digital code each comprise a step of clocking the respective digital code at a predetermined chip rate.

13. A communications method according to claim 10 wherein said comparing step comprises a step of determining a difference between the relative power levels of the leading information signal and the lagging information signal.

14. A communications method according to claim 13 wherein said altering step comprises a step of altering the rate at which the leading digital code, the base digital code and the lagging digital code are clocked in proportion to the difference between the relative power levels of the leading information signal and the lagging information signal.

* * * * *

UNITED STATES PATENT AND TRADEMARK OFFICE
CERTIFICATE OF CORRECTION

PATENT NO. : 5,841,808

DATED : November 24, 1998

INVENTOR(S) : Rizzo et al.

It is certified that error appears in the above-identified patent and that said Letters Patent is hereby corrected as shown below:

On the title page,

In the References Cited, OTHER PUBLICATIONS, line 3, "Magnavox" should start a new paragraph.

Column 73, line 65, "claim 1" should read --claim 5--.

Column 75, line 9, "sate" should read --gate--.

Signed and Sealed this

Eleventh Day of May, 1999

Q. TODD DICKINSON

*Attest:*

*Attesting Officer*  *Acting Commissioner of Patents and Trademarks*